May 14, 1968

R. McILROY 3,382,856

ENGINE FUEL INDUCTION SYSTEM

Filed Oct. 22, 1965

ROBERT McILROY
INVENTOR

BY John R. Faulkner
Robert E. McCollum
ATTORNEYS

May 14, 1968   R. McILROY   3,382,856
ENGINE FUEL INDUCTION SYSTEM
Filed Oct. 22, 1965   2 Sheets-Sheet 2

ROBERT McILROY
INVENTOR

BY *John R. Faulkner*
*Robert E. McCollum*
ATTORNEYS

United States Patent Office 3,382,856
Patented May 14, 1968

3,382,856
ENGINE FUEL INDUCTION SYSTEM
Robert McIlroy, Dearborn, Mich., assignor to Ford Motor Company, Dearborn, Mich., a corporation of Delaware
Filed Oct. 22, 1965, Ser. No. 500,553
9 Claims. (Cl. 123—127)

ABSTRACT OF THE DISCLOSURE

A dual induction system for an internal combustion engine, one portion of the system operating as a conventional downdraft venturi carburetor, a second portion of the system combining fuel and heated air in a mixing chamber of the intake manifold to provide improved combustion at low engine speeds.

This invention relates to a fuel induction system for internal combustion engines.

During idle and low engine speeds a conventional downdraft-type carburetor discharges most of its fuel through idle jet holes located adjacent to and slightly below the closed throttle valve. Because of the low air velocity through the carburetor at these speeds, the fuel introduced is only partially vaporized; thus, most of the fuel either is carried along as liquid droplets or its runs down the walls of the induction passages. The result is that only part of the fuel introduced into the air stream is completely burned during the engine combustion process. The remainder of the fuel is discharged as smog-producing, unburned or partially burned hydrocarbons. In addition, a discharge of incompletely burned fuel particles into the engine exhaust results in uneconomical engine operation.

It is, therefore, the principal object of this invention to provide an air-fuel mixture induction system that provides the simplicity and economy of a conventional downdraft-type carburetor during full and part-throttle operating speeds; and, that further provides a secondary induction system that completely vaporizes the fuel at idle and low speeds and eliminates the discharge of partially burned fuel into the exhaust of the engine.

Various systems have been proposed for reducing fuel waste during idle and low engine speeds. One is to use the heat of the engine coolant or exhaust gases to prewarm the carburetor inlet air. Such systems, however, in order to operate efficiently and with safety, require thermostatic controls and valving to prevent overheating of the engine. The additional expense and problems of servicing have made such systems unsatisfactory for general automobile engine use.

It is, therefore, another object of this invention to provide a simply constructed and inexpensively maintained induction system wherein heated air is mixed with the fuel during idle and low engine speeds.

A further object is to provide a hot air induction system that eliminates the necessity of thermostatic controls and auxiliary valving.

Another object is to provide an internal combustion engine with a separate induction system for use during idle and low engine speeds in which the mixture is completely vaporized and travels at high velocity directly toward the intake valve ports, thus reducing heat loss of the mixture, assuring a continued, completely vaporized fuel charge, and, finally, reducing exhaust emission of unburned hydrocarbons and improving operating economy.

It is also an object of this invention to provide a divided engine intake manifold having primary manifolding consisting of a distribution chamber and connecting channels that deliver the engine fuel-air mixture requirement to the intake valves during normal operating speeds; and, smaller, separate secondary manifolding consisting of a mixing chamber and connecting channels for mixing the engine low and idle speed fuel requirements with heated air, and delivering the completely vaporized mixture to the intake valves.

Specifically, it is an object of the present invention to provide a dual air-fuel mixture supply system having a primary charge forming means, primary channels in the intake manifold and primary intake passages in the cylinder head to deliver the primary charge to the intake valves; a secondary charge forming means to form a completely vaporized charge and to utilize the engine exhaust heat during engine idle speeds to assure complete vaporization, secondary channels in the intake manifold, and secondary intake passages in the cylinder head to deliver the heated secondary charge to the intake valves.

Other objects, features and advantages of the invention will become apparent upon reference to the succeeding, detailed description thereof, and to the drawings illustrating the preferred embodiment thereof; wherein, FIGURE 1 is a cross-sectional view of an engine fuel induction system embodying the invention;

Figure 3:
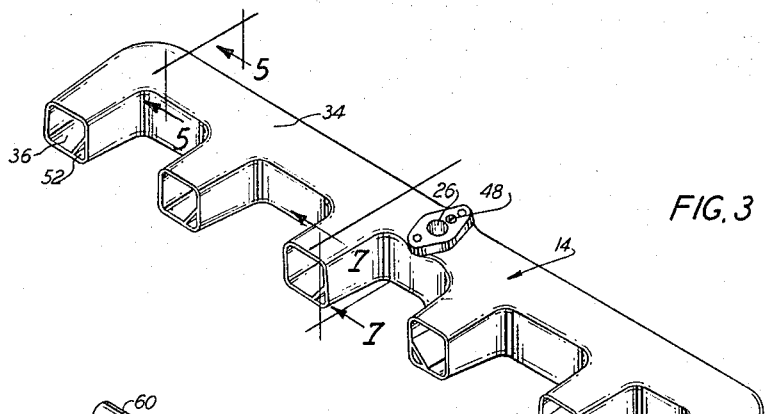
FIGURES 3 and 4 are perspective views, respectively, of the engine intake and exhaust manifolds embodying the invention.
Figure 4:
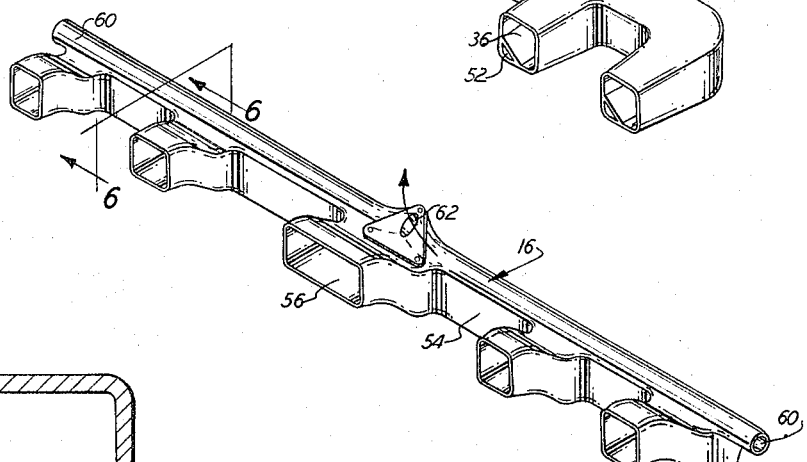
Figure 5:
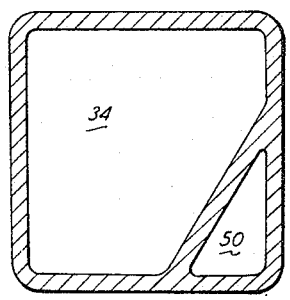
Figure 7:
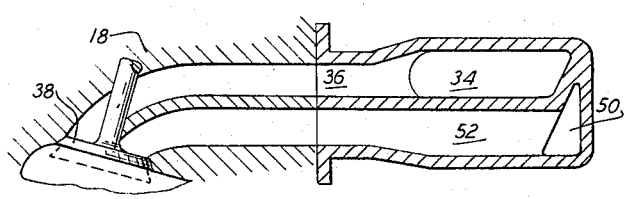
Figure 6:
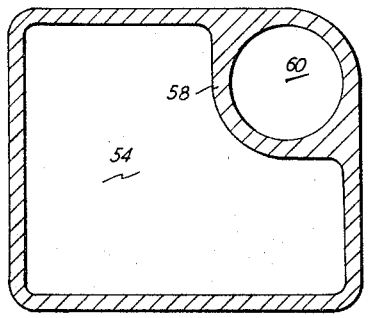

FIGURES 5 and 6 are enlarged cross-sectional views taken on planes indicated by and viewed in the direction of arrows 5—5 and 6—6, respectively, of FIGURES 3 and 4; and, FIGURE 7 is a cross-sectional view of a portion of an engine cylinder assembly, and taken in part on a plane indicated by and viewed in the direction of the arrows 7—7 of FIGURE 3.

Figure 1:
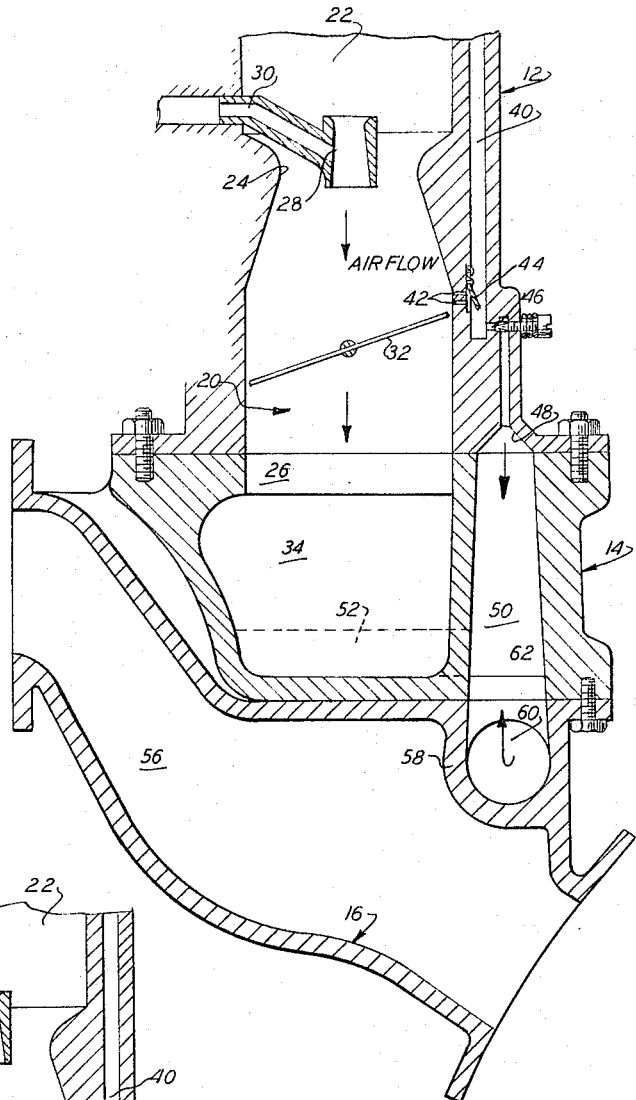

Referring to the drawings in detail, FIGURE 1 shows, in general, portions of a charge forming device or carburetor 12 of the downdraft type. It is positioned upon and bolted to an engine intake manifold 14 that overlies and is bolted to an exhaust manifold 16. Both the intake and exhaust manifolds may be retained against the side of an engine cylinder head 18 (FIGURE 7) by bolts or clips.

Carburetor 12 has a main induction passage 20 formed with an air inlet 22, a venturi section 24, and an outlet port 26, the latter opening into the interior of intake manifold 14. Venturi section 24 contains a primary venturi 28 that is supported on the carburetor housing by a main fuel supply conduit 30 opening into the venturi. A throttle valve 32 is pivotally mounted on the walls of the induction passage for controlling flow of air and fuel into the intake manifold.

As best seen in FIGURE 3, the carburetor outlet 26 discharges the main air-fuel mixture charge into a centrally located point of the engine intake manifold 14. The manifold has a main longitudinally extending passage 34 connected to six branch passages 36, each of which leads to a cylinder head intake port 38, as shown in FIGURE 7. The number of branches, of course, corresponds to the number of engine cylinders in the particular bank.

The carburetor is also formed with a secondary or engine idle speed fuel inlet passage 40. The fuel in passage 40, during engine idle or low speds, is initially mixed with a small amount of air from the main induction passage 20 that flows through air bleed passages 42 controlled by a flexible one-way flap valve 44. This will be explained more fully later. An adjustable needle valve 46 is provided for variably restricting the fuel supply, as desired, to control the rate of flow.

The fuel in passage 40 discharges through a port 48 (FIGURE 3) into the intake manifold 14. Port 48 connects directly with a secondary manifolding network that is independent of the main or primary manifolding passages 34 and 36. The secondary manifolding includes a longitudinally extending distribution and mixing channel 50 that is connected to separate ducts 52 formed on one side of each of the primary manifolding branch passages 36. The secondary ducts 52 are further connected independently of the primary system to the intake valve ports 38 adajacent the combustion chambers by separate passages, as seen in FIGURE 7.

The exhaust manifold 16 (FIGURE 4) has a conventional main longitudinally extending gas collecting passage 54 receiving the engine exhaust gases from six branch passages 56. Main passage 54 also has a partition or wall 58 that forms a small diameter fresh air channel or passage 60. This latter passage has a central discharge port 62 that is located directly below and opens into the secondary mixing channel 50 in intake manifold 14. Thus, an independent secondary supply of both fuel and air are provided for the idle speed control system.

The air for passage 58 can be provided by any suitable means, such as, for example, a direct connection of the line to the carburetor air inlet cleaner (not shown).

It should be noted that the relative sizes or cross-sectional areas of the manifold primary and secondary conduits and passages are chosen in accordance with the volumetric rate of flow that is desired at the engine speed levels obtainable. That is, the primary manifolding will be of a size to satisfy the engine air-fuel requirements at maximum load and speed, while the secondary manifold need be only of a size to satisfy the engine charge requirements during low or idle speed conditions of operation. The secondary manifolding will, therefore, be considerably smaller than the primary manifolding. The smaller cross-sectional areas result in increased velocity of the secondary air-fuel mixture and reduced heat loss from the mixture; and, thus further assures complete vaporization of the fuel when it reaches the intake valve ports 38.

Operation

FIGURE 1 shows the various movable parts of the carburetor in the positions they attain during engine idle or low speed conditions of operation. Throttle plate 32 is substantially closed, thus restricting the air flow through the inlet 22 to a low value. Rotation of the engine through its intake or suction stroke thus establishes a high vacuum acting in the intake manifold primary channel 34 and branch lines 36, and secondary chamber 50. With substantially no air flow through primary venturi 28, the pressure differential between the air in this portion of the induction passage and that acting on the fuel in line 30 at the source is substantially zero; therefore, for all practical purposes, no fuel flows through line 30.

The high vacuum in the main intake manifold passages 34 and 36 and secondary mixing chamber 50 permits the air at atmospheric pressure acting on the fuel at the source to force the fuel through the secondary inlet 40 into chamber 50. This flow of fuel creates a pressure differential on opposite sides of bleed passages 42, causing a small amount of air to mix with the fuel prior to its reaching chamber 50. This air bleed feature may be omitted, if desired. Some of the fuel then begins to vaporize. The high vacuum also immediately causes air to flow through the auxiliary air intake pipe 60, where it is warmed to approximately 300° F., for example, by the heat of the hot exhaust gases flowing along wall 58. This air is then mixed with the fuel in chamber 50 and vaporizes it so that a completely vaporized mixture is then drawn into the engine intake ports 38 through the branch passages 52. Thus, during engine idle or low speed operation, the fuel is efficiently mixed with air and completely vaporized and burned in the engine cylinders so that substantially no unburned hydrocarbons are present in the exhaust gases.

Figure 2:
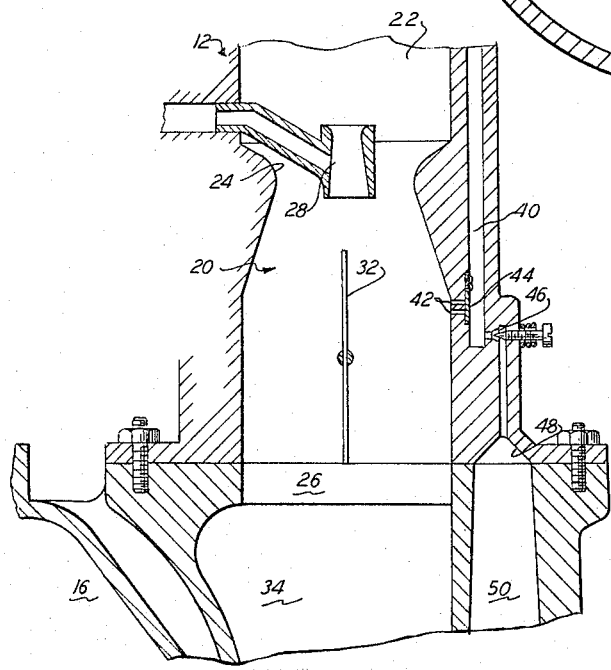
FIGURE 2 is a view similar to FIGURE 1 illustrating parts thereof in different operative positions.

Assuming now that the vehicle accelerator pedal is depressed to speed up the engine, throttle plate 32 rotates counterclockwise toward the full throttle position shown in FIGURE 2. As the throttle plate rotates, the high vacuum in the intake manifold decreases, with a resultant increase in air flow through main induction passage 20. The air velocity through the primary venturi 28, therefore, increases substantially. This provides the necessary pressure differential between the venturi passage and the fuel soruce to cause the fuel to flow through tube 30 and into and out of venturi 28. The fuel then mixes with the air, is completely vaporized, and passes into the main intake manifold passage 34 and branch passages 36 to discharge into the engine cylinder intake ports 38.

Simultaneous with the opening of throttle valve 32, the increased flow through main induction passage 20 creates a pressure drop on opposite sides of bleed holes 42, permitting the fuel in line 40 to close flap value 44. The concurrent decay in intake manifold vacuum reduces the vacuum effect in secondary mixing channel 50 so that less fuel is now forced into the channel 50 from line 40.

When the throttle plate has been rotated to the full throttle position shown in FIGURE 2, the intake manifold vacuum will have decreased to its minimum value (substantially atmospheric pressure). The secondary induction system will, therefore, be rendered substantially ineffective to supply fuel to the engine. The secondary air-fuel system is designed to supply approximately 90% of the air at engine idle, the remaining 10% being supplied through the primary system around the throttle plate 32. When the idle system ceases to supply fuel, approximately only 15% of the engine air requirements will be supplied through the secondary system.

The air-fuel ratio of the mixture in the secondary manifold, when the secondary system is operating, would be in the region of approximately 3:1 and at a temperature of say 300° F. On reaching the cylinders, the overall temperature of the charge would be about 220° F., after mixing with the air coming in through the main manifold. As manifold vacuum drops, as stated above, less air enters through this secondary system until at wide-open throttle, it will amount to something less than approximately 1% of the total.

While the invention has been illustrated in its preferred embodiment in the drawings, it will be clear to those skilled in the arts to which the invention pertains that many changes and modifications may be made thereto without departing from the scope of the invention.

What is claimed is:

1. In an internal combustion engine having an intake manifold, a cylinder head, intake valves within said cylinder head, and an exhaust manifold, a primary and secondary fuel-air mixture supply system comprising, in combination, a body having a venturi, a main air intake passage into said body and venturi, a fuel source, a primary fuel inlet from said fuel source to said venturi, a primary fuel-air induction passage connected to said venturi, a throttle valve pivotally mounted within said primary induction passage, a plurality of main channels in said intake manifold to deliver the primary mixtures to said cylinder head, cylinder head main channels to deliver the primary mixtures from said intake manifold main channels to their respective intake valves, a secondary air inlet passage adjoining said exhaust manifold to induct and superheat the secondary system air, said secondary air inlet passage and exhaust manifold being mutually independent, a secondary fuel inlet passage, a mixing chamber in said intake manifold receiving fuel directly from said secondary fuel inlet passage and superheated air from said secondary air inlet passage, said secondary fuel inlet passage directly connecting said fuel source and said mixing chamber and delivering fuel to said mixing chamber of said intake manifold in quantities responsive to the pressure differential between the pressures acting on said fuel source and in said mixing chamber of said intake manifold, secondary intake manifold channels communicating said mixing chamber with said cylinder head, and cylinder head secondary channels to deliver the secondary mixtures from said intake manifold secondary channels to their respective intake valves.

2. In an internal combustion engine having a carburetor, an intake manifold, a cylinder head, intake valves in said cylinder head, and an exhaust manifold, a dual fuel-air mixture suply system comprising, a primary system having an air-fuel induction passage in said carburetor, a throttle valve disposed in said induction passage for controlling the quantity of air flow therethrough, means for supplying fuel to said induction passage in accordance with the quantity of air flow therethrough, primary channels in said intake manifold communicating said induction passage with said cylinder head, passage means in said cylinder head communicating said intake manifold primary channels with their respective intake valves, a secondary system having a secondary fuel inlet passage in said carburetor, said secondary fuel inlet passage being in communication with said fuel source, a secondary air inlet passage adjoining said exhaust manifold to heat the secondary system intake air, a mixing chamber in said intake manifold to receive heated secondary system air from said secondary air inlet passage and fuel from said secondary fuel inlet passage, means responsive to the differential between the pressure of said fuel and the environmental pressure in said mixing chamber for controlling the quantity of fuel delivered by said fuel inlet passage, secondary runners in said intake manifold communicating said mixing chamber with said cylinder head, said passage means in said cylinder head communicating said intake manifold secondary runners with their respective intake valves.

3. In an internal combustion engine having an intake manifold, a cylinder head, intake valves within said cylinder head, and an exhaust manifold, a primary and secondary fuel-air mixture supply system comprising, in combination, a body having a venturi, a main air intake passage into said body and venturi, a primary fuel inlet to said venturi, a main primary fuel-air induction passage connected to said venturi, a throttle valve pivotally mounted within said main induction passage, a plurality of main channels in said intake manifold to deliver the primary mixtures to said cylinder head, cylinder head main channels to deliver the primary mixtures from said intake manifold primary channels to their respective intake valves, a secondary air inlet passage adjoining said exhaust manifold to induct and superheat the secondary system air, said secondary air inlet passage and exhaust manifold being mutually independent, a secondary fuel inlet passage, a mixing chamber receiving fuel from said secondary fuel inlet passage and superheated air from said secondary air inlet passage, said secondary fuel inlet passage delivering fuel to said mixing chamber in quantities responsive to the pressure differential between the pressures acting on said secondary fuel and in said mixing chamber, secondary intake manifold channels communicating said mixing chamber with said cylinder head, and cylinder head secondary channels to deliver the secondary mixtures from said intake manifold secondary channels to their respective intake valves, said body including a bleed passage communicating said main induction passage with said secondary fuel inlet passage, said bleed passage being located adjacent and upstream of said throttle valve when the throttle valve it substantially closed and downstream of said throttle valve when it is in a partially open position, a flexible flap covering the secondary fuel inlet side of said bleed passage when said throttle valve is pivotally positioned upstream of said bleed passage, said flap being movable in response to a pressure differential existing between said main induction passage and said secondary fuel inlet passage acting thereon to permit air from the main induction passage to pass through the bleed passage into the secondary fuel inlet passage when said throttle valve is substantially closed.

4. In an internal combustion engine having a carburetor, an intake manifold, a cylinder head, intake valves in said cylinder head, and an exhaust manifold, a dual fuel-air mixture supply system comprising, a primary system having an air-fuel induction passage in said carburetor, a throttle valve disposed in said induction passage for controlling the quantity of air flow therethrough, means for supplying fuel to said induction passage in accordance with the quantity of air flow therethrough, primary channels in said intake manifold communicating said induction passage with said cylinder head, passage means in said cylinder head communicating said intake manifold primary channels with their respective intake valves, a secondary system having a fuel inlet passage in said carburetor, said fuel inlet passage being in communication with said fuel source, a secondary air inlet passage adjoining said exhaust manifold to heat the secondary system intake air, a mixing chamber in said intake manifold to receive heated secondary system air and fuel from said fuel inlet passage, means responsive to the differential between the pressure of said fuel and the environmental pressure in said mixing chamber for controlling the quantity of fuel delivered by said fuel inlet passage, secondary runners in said intake manifold communicating said mixing chamber with said cylinder head, said passage means in said cylinder head communicating said intake manifold secondary runners with their respective intake valves, an air bleed passage in said carburetor communicating said main induction passage with said secondary fuel inlet passage, said air bleed passage being located upstream of said throttle valve when said throttle valve is in an essentially closed position and downstream of said throttle valve when in a partially open position, said air bleed passage having one-way valve means permitting flow only in a direction from said main induction passage to said secondary fuel inlet passage.

5. A fuel induction system for use with an internal combustion engine having intake valves and a cylinder head having primary and secondary intake runners leading to said intake valves, comprising, a carbuertor having a primary air-fuel charge forming means and a secondary fuel passage, an intake manifold having a main inlet and a primary mixing chamber to receive a primary charge through said main inlet from said carburetor, intake manifold primary runners leading respectively from said primary mixing chamber to said cylinder head primary runners, said intake manifold having a secondary mixing chamber, a secondary fuel inlet to said secondary mixing chamber receiving fuel directly from said secondary fuel passage of said carburetor, a secondary air inlet to said secondary mixing chamber to introduce air directly to said secondary mixing chamber, secondary intake manifold runners leading respectively from said secondary mixing chamber to said cylinder head secondary runners, wall means separating said primary mixing chamber and manifold runners from said secondary mixing chamber and manifold runners, said secondary mixing chamber and manifold runners and said primary mixing chamber and manifold runners being mutually independent and adjacently positioned and having at least one common channel dividing wall at any cross section, the cross-sectional areas of the primary mixing chamber and manifold runners being determined according to the volumetric rates of flow therethrough when said engine is operating at maximum engine speed, the cross-sectional areas of said secondary mixing chamber and manifold runners being determined according to the volumetric rates of flow therethrough when said engine is operating at idle speed.

6. In an internal combustion engine having a fuel source, a carburetor, an intake manifold, an exhaust manifold, intake valves, the invention comprising, in combination, a primary induction system having an air inlet, a fuel inlet from said fuel source, charge forming means in said carburetor receiving air and fuel from said inlets, a primary chamber in said intake manifold receiving the air-fuel mixture from said charge forming means, primary runners communicating between said chamber and said intake valves to deliver the air-fuel mixture to said valves, a secondary induction system having an air inlet passage cooperatively associated with said exhaust manifold to heat the secondary system air, a secondary system fuel inlet passage within said carburetor receiving fuel from said fuel source, a secondary mixing chamber in said intake manifold receiving heated air from said secondary air inlet, one end of said secondary fuel inlet passage comprising a port which discharges fuel directly into said secondary mixing chamber for mixture with the heated air, secondary runners in said intake manifold communicating between said secondary mixing chamber and said intake valves.

7. In an internal combustion engine having an intake valve, a dual air-fuel mixture supply system including a carburetor having a main induction system and an idle-fuel inlet passage, said main induction system including a fuel-air mixing passage, an air inlet and a fuel inlet discharging into said mixing passage, a throttle valve determining the flow rates of fuel from said main system fuel inlet and said idle-fuel inlet passage pivotally mounted within said main system mixing passage, whereby the fuel flow from said main system fuel inlet increases as the throttle valve opens and the fuel flow from said idle-fuel inlet passage decreases as the throttle valve opens, said carburetor being formed with an air bleed hole communicating said idle-fuel inlet passage and said main system fuel-air mixing passage, said bleed hole being located upstream of said throttle valve when the latter is in a closed position, an intake manifold having a main inlet port, a main chamber communicating with said carburetor main system mixing passage through said main inlet port, a main runner communicating said main chamber and said intake valve, an idle-fuel inlet port, a secondary chamber communicating with said carburetor idle-fuel inlet passage through said manifold idle-fuel inlet port, a secondary runner communicating said secondary chamber and said intake valve.

8. In an internal combustion engine having an intake valve, a dual air-fuel mixture supply system including a carburetor having a main induction system and an idle-fuel inlet passage, said main induction system including a fuel-air mixing passage, an air inlet and a fuel inlet discharging into said mixing passage, a throttle valve determining the flow rates of fuel from said main system fuel inlet and said idle-fuel inlet passage pivotally mounted within said main system mixing passage, an intake manifold having a main inlet port, a main chamber communicating with said carburetor main system mixing passage through said main inlet port, a main runner communcating said main chamber and said intake valve, an idle-fuel inlet port, a secondary chamber communicating with said carburetor idle-fuel inlet passage through said manifold idle-fuel inlet port, an idle-air inlet port in said secondary chamber, a secondary runner communicating said secondary chamber and said intake valve.

9. In an internal combustion engine having an intake valve and an exhaust manifold, a dual air-fuel mixture supply system including a carburetor having a main induction system and an idle-fuel inlet passage, said main induction system including a fuel-air mixing passage, an air inlet and a fuel inlet discharging into said mixing passage, a throttle valve determining the flow rates of fuel from said main system fuel inlet and said idle-fuel inlet passage pivotally mounted within said main system mixing passage, an intake manifold having a main inlet port, a main chamber communicating with said carburetor main system mixing passage through said main inlet port, a main runner communicating said main chamber and said intake valve, an idle-fuel inlet port, a secondary chamber communicating with said carburetor idle-fuel inlet passage through said manifold idle-fuel inlet port, an idle-air inlet port in said secondary chamber, an idle-air inlet passage cooperatively associated with said exhaust manifold to heat the air passing therethrough, said secondary chamber communicating with said idle-air inlet passage through said idle-air inlet port, a secondary runner communicating said secondary chamber and said intake valve.

References Cited
UNITED STATES PATENTS

| | | | |
|---|---|---|---|
| 2,317,625 | 4/1943 | Mallory | 123—127 |
| 2,415,860 | 2/1947 | Ball et al. | 123—127 |
| 2,448,043 | 8/1948 | Nash | 123—127 |
| 2,611,352 | 9/1952 | Allday | 123—127 |
| 3,171,395 | 3/1965 | Bartholomew | 123—127 |

JULIUS E. WEST, *Primary Examiner.*